US006158995A

United States Patent [19]

Muramatsu et al.

[11] Patent Number: 6,158,995
[45] Date of Patent: Dec. 12, 2000

[54] SEALED COMPRESSOR HAVING PIPE CONNECTORS AND METHOD OF JOINING PIPE CONNECTORS TO SEALED CASING

[75] Inventors: Shigeru Muramatsu, Kusatsu; Hiroshi Takano, Kouka-gun; Hiroyuki Fukuhara, Otsu, all of Japan

[73] Assignee: Matsushita Electric Industrial Co., Ltd., Osaka, Japan

[21] Appl. No.: 09/106,043

[22] Filed: Jun. 29, 1998

[30] Foreign Application Priority Data

Jun. 30, 1997 [JP] Japan .................................. 09-173427
Jun. 30, 1997 [JP] Japan .................................. 09-173446

[51] Int. Cl.[7] ............................. F04C 15/00; F04B 17/00

[52] U.S. Cl. .......................... 418/181; 418/248; 417/902; 417/952; 252/68; 508/485

[58] Field of Search .................................... 418/270, 248; 417/902, 952; 252/68; 508/485

[56] References Cited

U.S. PATENT DOCUMENTS

| | | | |
|---|---|---|---|
| 3,870,440 | 3/1975 | Zuercher, Jr. | 418/248 |
| 3,871,800 | 3/1975 | Slayton | 418/248 |
| 4,240,774 | 12/1980 | Ladusaw | 418/248 |
| 4,815,947 | 3/1989 | Okoma et al. | 418/902 |
| 5,269,955 | 12/1993 | Kawaguchi et al. | 252/68 |
| 5,452,586 | 9/1995 | Hamid | 252/68 |
| 5,653,909 | 8/1997 | Muraki et al. | 252/68 |
| 5,698,502 | 12/1997 | Pafford et al. | 508/485 |

*Primary Examiner*—Thomas Denion
*Assistant Examiner*—Thai Ba Trieu
*Attorney, Agent, or Firm*—Wenderoth, Lind & Ponack, L.L.P.

[57] ABSTRACT

A sealed compressor has a sealed casing in which a motor section and a compression section are both accommodated, and also has a pipe connector including at least one sleeve. The sleeve has a first end and a second end opposite to each other. The first end is inserted into a sleeve insertion hole defined in the compression section to allow a refrigerant to flow therethrough, while the second end is hermetically brazed to a copper pipe disposed outside the sealed casing. The sleeve is formed by deep-drawing a copper-plated steel plate into a generally cylindrical shape.

3 Claims, 8 Drawing Sheets

5
1a
1
2
1b
6
4
10
3
9
8
1c 5
le
1a
1
2
1b
6
4
3
10
9
8
lc

SEALED COMPRESSOR HAVING PIPE CONNECTORS AND METHOD OF JOINING PIPE CONNECTORS TO SEALED CASING

BACKGROUND OF THE INVENTION

1. Field of the Invention

The present invention relates generally to a sealed compressor for use in a refrigerator, an air conditioner or the like and, in particular but not exclusively, to pipe connectors for connecting suction and discharge pipes to a sealed casing of the sealed compressor. The present invention also relates to a method of joining the pipe connectors to the sealed casing.

2. Description of Related Art

FIG. 1 depicts a conventional sealed compressor having a sealed casing 101 in which a motor section 102 and a compression section 103 are both accommodated. The sealed casing 101 is provided with a suction pipe connector 104 secured thereto through which a refrigerant is introduced thereinto and a discharge pipe connector 105 secured thereto through which a compressed refrigerant is discharged therefrom. The suction pipe connector 104 and the discharge pipe connector 105 lead to an evaporator (not shown) and a condenser (not shown), respectively, to form a refrigeration cycle. Because both the evaporator and the condenser are connected to copper pipes, a material which can be readily connected to the copper pipes, for example, by copper-brazing is selected for the suction pipe connector 104 and the discharge pipe connector 105. For this reason, both the suction pipe connector 104 and the discharge pipe connector 105 are generally made of copper pipes. When each of the suction pipe connector 104 and the discharge pipe connector 105 is secured to the sealed casing 101, which is generally made of steel, it is the general practice that a portion of the pipe connector 104 or 105 is first inserted into a hole defined in the sealed casing 101 and is then rigidly secured thereto by silver-brazing with the use of flux.

More specifically, as shown in FIG. 1, the sealed casing 101 has a hole defined therein in alignment with a suction hole 106 defined in the compression section 103. An external suction sleeve 107 is inserted into the hole of the sealed casing 101 and is secured thereto. The compression section 103 also has a suction sleeve insertion hole 108 defined therein so as to be continuous to the suction hole 106. The suction sleeve insertion hole 108 is positioned radially outwardly of the suction hole 106 and has a diameter slightly larger than that of the suction hole 106. The suction pipe connector 104 includes the external suction sleeve 107 referred to above and an internal suction sleeve 109 pressed into the suction sleeve insertion hole 108 so that a low-pressure refrigerant to be introduced into the sealed casing 101 may be separated from a high-pressure refrigerant inside the sealed casing 101. The length of the internal suction sleeve 109 is determined so that an outer end thereof may be positioned radially outwardly of an outer end of the external suction sleeve 107. After a suction pipe 110 has been inserted into the internal suction sleeve 109 pressed into the suction sleeve insertion hole 108, the suction pipe 110, the internal suction sleeve 109 and the external suction sleeve 107 are simultaneously hermetically secured together by brazing, thereby separating the external atmosphere, the low-pressure refrigerant introduced into the sealed casing 101, and the high-pressure refrigerant inside the sealed casing 101 from one another.

In the above-described construction, the internal suction sleeve 109 is made of a copper pipe or a copper-plated steel pipe, while the external suction sleeve 107 and the discharge pipe connector 105 both secured to the sealed casing 101 are generally made of copper pipes. The suction pipe 110 is also generally made of a copper pipe.

The sealed compressor of the above-described construction has a problem in that in applications where a copper pipe is hermetically connected to the steel sealed casing 101 by silver-brazing, flux is inevitably required, which must be removed after the brazing. Removal of the flux is generally carried out in hot water in which the flux dissolves.

On the other hand, HFC refrigerants listed as candidates for alternative refrigerants that cause no destruction of the ozone layer are generally used with an ester-based lubricant compatible therewith. The ester-based lubricant has a tendency to cause hydrolysis, which in turn produces acids. Accordingly, if a compressor contains an HFC refrigerant, it is necessary to manage the compressor so that the amount of water contained therein may be as small as possible. Furthermore, even if the amount of chlorine contained in the flux is extremely small, it acts to promote decomposition of the HFC refrigerant and that of the ester-based lubricant. Because of this, complete removal of the flux is required.

Conversely, silver-brazing requires a process in which water and chlorine-containing impurities remain that must be mostly removed during the manufacture of a compressor for use with an alternative refrigerant. In addition, it is difficult to immerse a relatively large body such as the sealed casing in hot water, and if the compressor is of a complicated structure, it is very difficult and time-consuming to completely remove water that has been used for removal of the flux.

Also, during brazing, members to be joined together must be heated to a temperature at which a brazing material melts. To this end, such members are generally heated with flames of, for example, a torch. By so doing, copper pipes as the connectors are annealed and reduced in strength. The flames produce on the members an oxide layer, which sometimes promotes deterioration of a lubricant or a refrigerant.

Furthermore, because the copper pipe connector has a relatively large thermal expansion coefficient, the pipe connector expands due to heat generated during brazing and contracts due to subsequent cooling, thus deteriorating the sealing properties between the pipe connector and the insertion hole thereof. Also, component parts of the compression section are likely to be deviated from their desired positions by relatively large forces applied thereto. If a steel pipe is used for the pipe connector, it must be finished into a desired size and then copper-plated, resulting in an increase in the manufacturing cost.

SUMMARY OF THE INVENTION

The present invention has been developed to overcome the above-described disadvantages.

It is accordingly an objective of the present invention to provide a sealed compressor having a sealed casing to which pipe connectors are hermetically joined without brazing which requires flux and flames.

Another objective of the present invention is to provide a method of joining pipe connectors to the sealed casing without brazing.

In accomplishing the above and other objectives, the sealed compressor according to the present invention includes a sealed casing in which a motor section and a compression section are both accommodated, and also includes a first sleeve having a first end and a second end opposite to each other. The first end is inserted into a sleeve insertion hole defined in the compression section to allow a refrigerant to flow therethrough, while the second end is hermetically brazed to a copper pipe disposed outside the sealed casing. The first sleeve is formed by deep-drawing a copper-plated steel plate into a generally cylindrical shape.

The deep-drawing reduces the manufacturing cost of the first sleeve. Furthermore, the use of the copper-plated steel plate enables the first sleeve to be resistance-welded to the sealed casing and to be copper-brazed to the copper pipe.

Advantageously, the first sleeve is inserted into a second sleeve, wherein the second end is flared and wherein the second sleeve is hermetically brazed to an external surface of the first sleeve, while the copper pipe is hermetically brazed to an internal surface of the first sleeve.

Because copper deposits formed on internal and external surfaces of the first sleeve are exposed outside, the first sleeve can be brazed to both the second sleeve and the copper pipe simultaneously.

In another aspect of the present invention, a sleeve is made of a copper-plated steel pipe and has a first end and a second end opposite to each other. The first end is welded to the sealed casing, while the second end is copper-brazed to a copper pipe disposed outside the sealed casing.

Because the thickness of copper deposits on the sleeve is of the order of microns, the application of pressure and a subsequent flow of electricity as in resistance welding removes the copper deposit on that surface of the sleeve which is held in contact with the sealed casing, thus enabling hermetic welding of the internal or base steel pipe to the steel plate of the sealed casing. Flux as required in silver-brazing is not used and, hence, flux removal with the use of water is not required, making it possible to reduce water or chlorine-based impurities.

Conveniently, the second end is flared to facilitate copper-brazing.

Advantageously, the first end is tapered to expand outwardly and is hermetically resistance-welded to an edge of a hole defined in the sealed casing. By so doing, the sleeve inserted into the hole of the sealed casing from inside can be rigidly and reliably secured to the sealed casing.

The sealed casing may contain an HFC refrigerant and an ester-based lubricant. Because no flux is used during welding, impurities that may decompose a refrigerant or a lubricant do not enter the sealed casing, resulting in a highly reliable compressor.

In a further aspect of the present invention, a sleeve is made of steel pipe and has a small-diameter portion and a large-diameter portion continuous to each other. The large-diameter portion has a tapered end expanding outwardly and hermetically resistance-welded to an edge of a hole defined in the sealed casing.

By this construction, inward expansion of the tapered end caused by the resistance-welding can be accommodated within the large-diameter portion and, hence, insertion of another sleeve into the above sleeve can be readily and positively carried out.

In a still further aspect of the present invention, the sealed casing has a generally flat portion in which a hole is defined wherein a sleeve made of a steel pipe is hermetically welded directly to the generally flat portion to communicate with the hole, allowing a refrigerant to flow therethrough.

Because no brazing material nor flux is used, not only can the welding process be simplified, but also firm joining can be realized.

The generally flat portion is formed with a cylindrical body of the sealed casing. Because the sleeve does not protrude inside the sealed casing, incorporation of the motor section and the compression section into the sealed casing and assemblage of the former inside the latter can be readily carried out.

The method according to the present invention includes the steps of: forming a generally flat portion with the sealed casing; forming a hole in the generally flat portion; preparing a sleeve made of a copper pipe; tapering one end of the sleeve; and causing electric current to flow through the sleeve while the sleeve is being pressed against the generally flat portion with the one end of the sleeve held in contact with the generally flat portion, thereby hermetically welding the sleeve to the generally flat portion to allow a refrigerant to flow through the hole in the generally flat portion.

Advantageously, the one end of the sleeve is tapered outwardly.

Because the contact portion is heated by the electric current, simultaneously applying a pressure thereto extends the tapered end of the sleeve radially outwardly while removing an oxide layer from the contact portion, making it possible to bring fresh surfaces into close contact with each other. A continuous flow of electricity heats and fuses the tapered end of the copper pipe and diffuses copper atoms into the steel member, realizing firm joining.

Alternatively, the method according to the present invention includes the steps of: forming a generally flat portion with the sealed casing; forming a hole in the generally flat portion; preparing a sleeve made of a copper pipe; causing electric current to flow through the sleeve while the sleeve is being rotated and pressed against the generally flat portion with one end of the sleeve held in contact with the generally flat portion, thereby hermetically welding the sleeve to the generally flat portion to allow a refrigerant to flow through the hole in the generally flat portion.

The method may further include the step of tapering the one end of the sleeve prior to the step of causing electric current to flow.

Rotating the sleeve and pressing it against the generally flat portion removes an oxide layer from a contact portion, while a simultaneous flow of electricity fuses copper and diffuses copper atoms into the steel member, realizing firm joining.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on applications Nos. 9-173427 and 9-173446 both filed Jun. 30, 1997 in Japan, the content of which is incorporated hereinto by reference.

Figure 1:
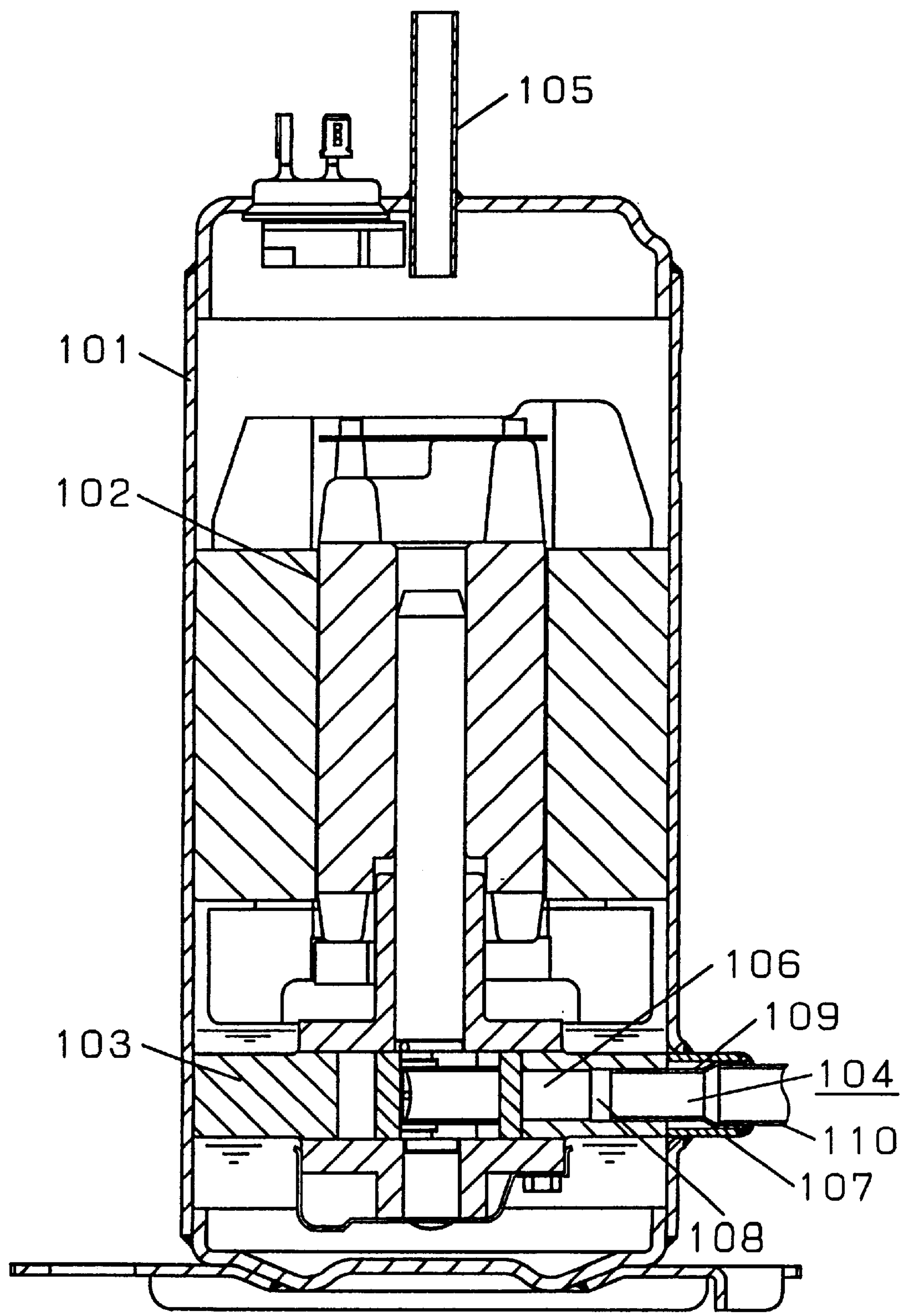
FIG. 1 is a vertical sectional view of a conventional sealed compressor.
Figure 2:
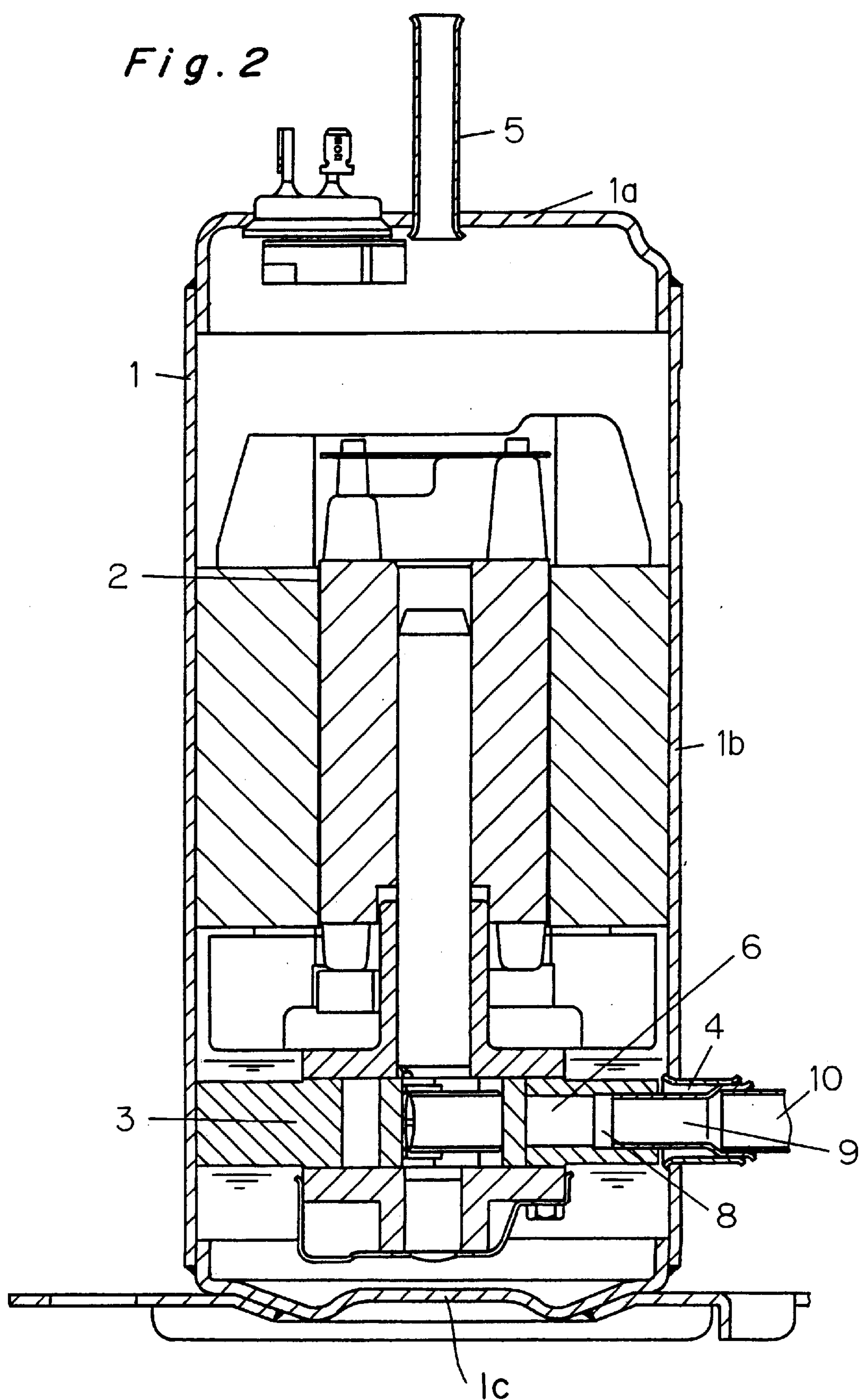
FIG. 2 is a vertical sectional view of a sealed compressor according to a first embodiment of the present invention.

Referring now to the drawings, there is shown in FIG. 2 a sealed compressor according to a first embodiment of the present invention. The sealed compressor includes a sealed casing 1 having a generally cylindrical body 1*b*, an upper cover 1*a* secured to an upper portion of the cylindrical body 1*b*, and a bottom cover 1*c* secured to a lower portion of the cylindrical body 1*b*. They are each formed from a steel plate and hermetically welded together to form the sealed casing 1. A motor section 2 and a compression section 3 are both accommodated in the sealed casing 1. The compression section 3 includes a rolling-piston type compression mechanism, and the sealed casing 1 is filled with a high-pressure refrigerant discharged therefrom when the compressor is in use. A suction pipe connector 4 through which a refrigerant is introduced into the sealed casing 1 is secured to the cylindrical body 1*b*, while a discharge pipe connector 5 through which the high-pressure refrigerant is discharged from the sealed casing 1 is secured to the upper cover 1*a* and is generally copper-brazed to a discharge pipe (not shown) made of copper. The suction pipe connector 4 and the discharge pipe connector 5 lead to an evaporator (not shown) and a condenser (not shown), respectively, to form a refrigeration cycle.

Figure 3:
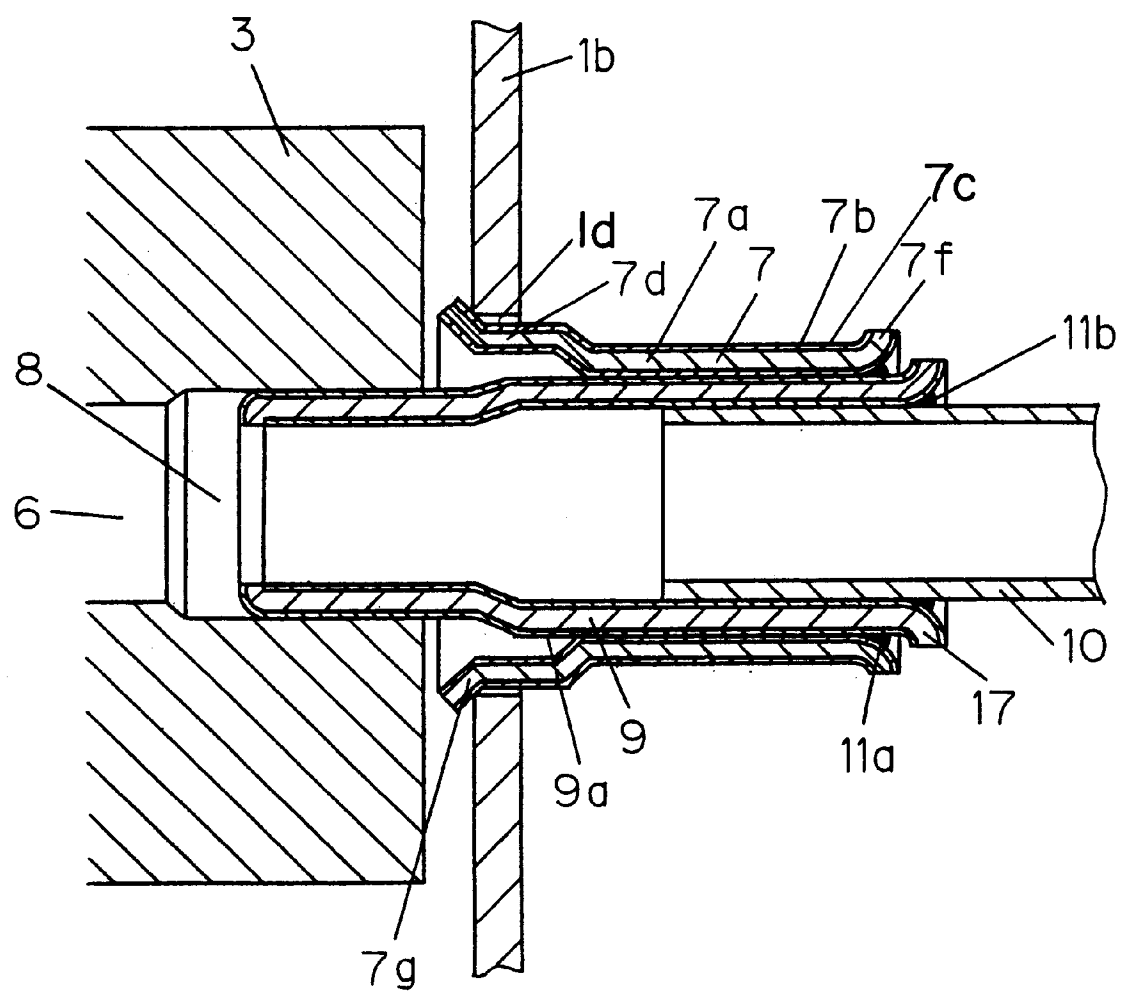
FIG. 3 is a vertical sectional view of a suction pipe connector secured to the sealed compressor of FIG. 2.

As shown in FIG. 3, the suction pipe connector 4 includes an external suction sleeve 7 inserted into a hole 1*d* defined in the cylindrical body 1*b* of the sealed casing 1. The hole 1*d* of the sealed casing 1 is formed in alignment with a suction hole 6 and a suction sleeve insertion hole 8 both defined in the compression section 3. The suction sleeve insertion hole 8 is positioned radially outwardly of and continuous to the suction hole 6 and has a diameter slightly greater than that of the suction hole 6. The suction pipe connector 4 also includes an internal suction sleeve 9 pressed into the suction sleeve insertion hole 8 so that a low-pressure refrigerant to be introduced into the sealed casing 1 may be separated from a high-pressure refrigerant inside the sealed casing 1. The length of the internal suction sleeve 9 is determined so that an outer end thereof may be positioned radially outwardly of an outer end of the external suction sleeve 7. After a suction pipe 10 has been inserted into the internal suction sleeve 9 pressed into the suction sleeve insertion hole 8, the suction pipe 10, the internal suction sleeve 9 and the external suction sleeve 7 are simultaneously hermetically copper-brazed together, thereby separating the external atmosphere, the low-pressure refrigerant introduced into the sealed casing 1, and the high-pressure refrigerant inside the sealed casing 1 from one another.

Figure 4A:
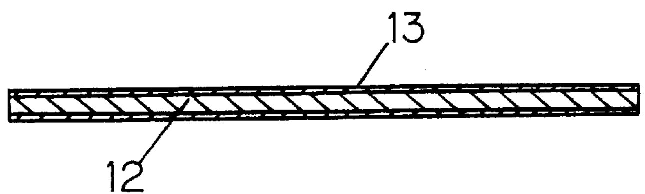
FIG. 4A is a vertical sectional view of a copper-plated steel plate used to make an internal suction sleeve of the suction pipe connector of FIG. 3.
Figure 4B:
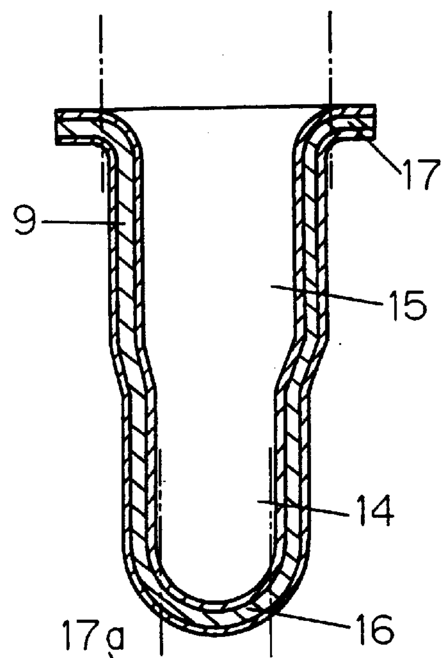
FIG. 4B is a vertical sectional view of the copper-plated steel plate after deep draw forming.
Figure 4C:
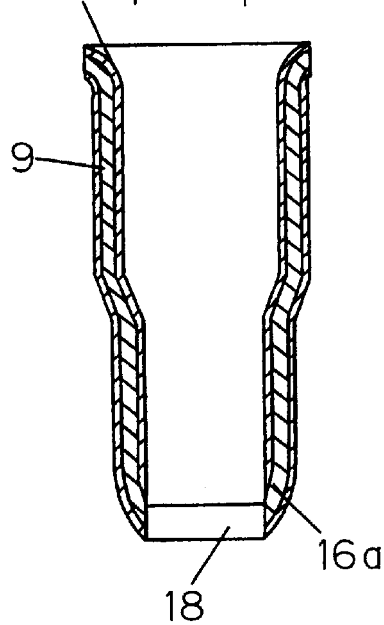
FIG. 4C is a vertical sectional view of the internal suction sleeve.

FIGS. 4A, 4B and 4C depict the manner in which the internal suction sleeve 9 is made.

As shown in FIG. 4A, a copper-plated steel plate 12 having copper deposits 13 formed on opposite surfaces thereof is first cut into a disc shape. The copper deposits 13 preferably have a thickness ranging from 5 to 100 microns. The copper-plated and disc-shaped steel plate 12 is then formed, by deep draw forming or pressing, into a generally cylindrical shape having a small-diameter portion 14 and a large-diameter portion 15 continuous to each other. To facilitate the pressing and to make the wall thickness uniform, a round-headed punch is used. After the pressing, the generally cylindrical member has a closed and rounded front portion 16 and a flanged open rear portion 17 extending radially outwardly from a cylindrical body. Subsequently, the rounded front portion 16 and the flanged rear portion 17 are cut in a direction axially of the generally cylindrical member, as shown by double-dotted chain lines in FIG. 4B, thus removing a central portion from the front portion 16 and a generally flat flange from the rear portion 17, and forming a round outlet opening 18 in the front portion 16. Because the front portion 16 has an axially rounded external surface 16*a* radially outwardly of the outlet opening 18, the internal suction sleeve 9 can be smoothly pressed into the suction sleeve insertion hole 8 without any damage, thus ensuring the sealing properties. Furthermore, because only the generally flat flange is removed from the rear portion 17, the rear portion 17 is still provided with a flared portion having an axially rounded internal surface 17*a* on which the copper deposit 13 remains, thus facilitating copper-brazing of the copper suction pipe 10 with the internal suction sleeve 9.

If the rear portion 17 of the generally cylindrical member is cut in a direction radially thereof, the base metal, i.e., the internal steel that repels a copper-brazing material is exposed at a location close to the suction pipe 10, making it difficult to ensure reliable and hermetic copper-brazing.

Also, axial cutting can be achieved in a pressing machine immediately after the pressing, resulting in a reduction in the manufacturing cost of the internal suction sleeve 9. In addition, because steel is smaller in thermal expansion than copper, the internal suction sleeve 9 is not much affected by heat generated during brazing and by subsequent cooling and, hence, does not expand and contract to such an extent that sealing between the internal suction sleeve 9 and the suction sleeve insertion hole 8 will be lost or component parts of the compression section will be deviated from their desired positions by relatively large forces applied thereto.

The external suction sleeve 7 is made of a copper-plated steel pipe 7*a* having internal and external surfaces on each of which a copper deposit 7*b* is formed. The external suction sleeve 7 has a small-diameter portion 7*c*, a large-diameter portion 7*d* continuous to the small-diameter portion 7*c*, a tapered inner end 7*g* expanding outwardly towards the inside of the sealed casing 1, and a flared outer end 7*f*. The small-diameter portion 7*c* has an internal diameter close to the external diameter of the internal suction sleeve 7. The external suction sleeve 7 is inserted into the hole 1*d* of the sealed casing 1 from inside, and the tapered inner end 7*g* is rigidly secured to the sealed casing 1 by resistance welding. At this moment, the tapered inner end 7*g* expands inwardly under the influence of a pressure required for the resistance welding or strains caused by the resistance welding. Such strains are mainly caused by the fact that the hole 1*d* is formed in the cylindrical body 1*b* of the sealed casing 1, and a peripheral edge of the hole 1*d* does not lie on a flat plane. The provision of the large-diameter portion 7*d* facilitates insertion of the internal suction sleeve 9 into the external suction sleeve 7 in the presence of such strains or the inward expansion of the tapered inner end 7*g*. The flared outer end 7*f* of the external suction sleeve 7 facilitates copper-brazing thereof with the internal suction sleeve 9 inserted thereinto, because the inner copper deposit of the external suction sleeve 7 faces the outer copper deposit of the internal suction sleeve 9. For the same reason, the flared rear portion or outer end 17 of the internal suction sleeve 9 facilitates copper-brazing thereof with the copper-made suction pipe 10 inserted thereinto. The external suction sleeve 7, the internal suction sleeve 9, and the suction pipe 10 can be copper-brazed simultaneously by regulating the length of the internal suction sleeve 9 protruding outwardly from the external suction sleeve 7.

Figure 5:
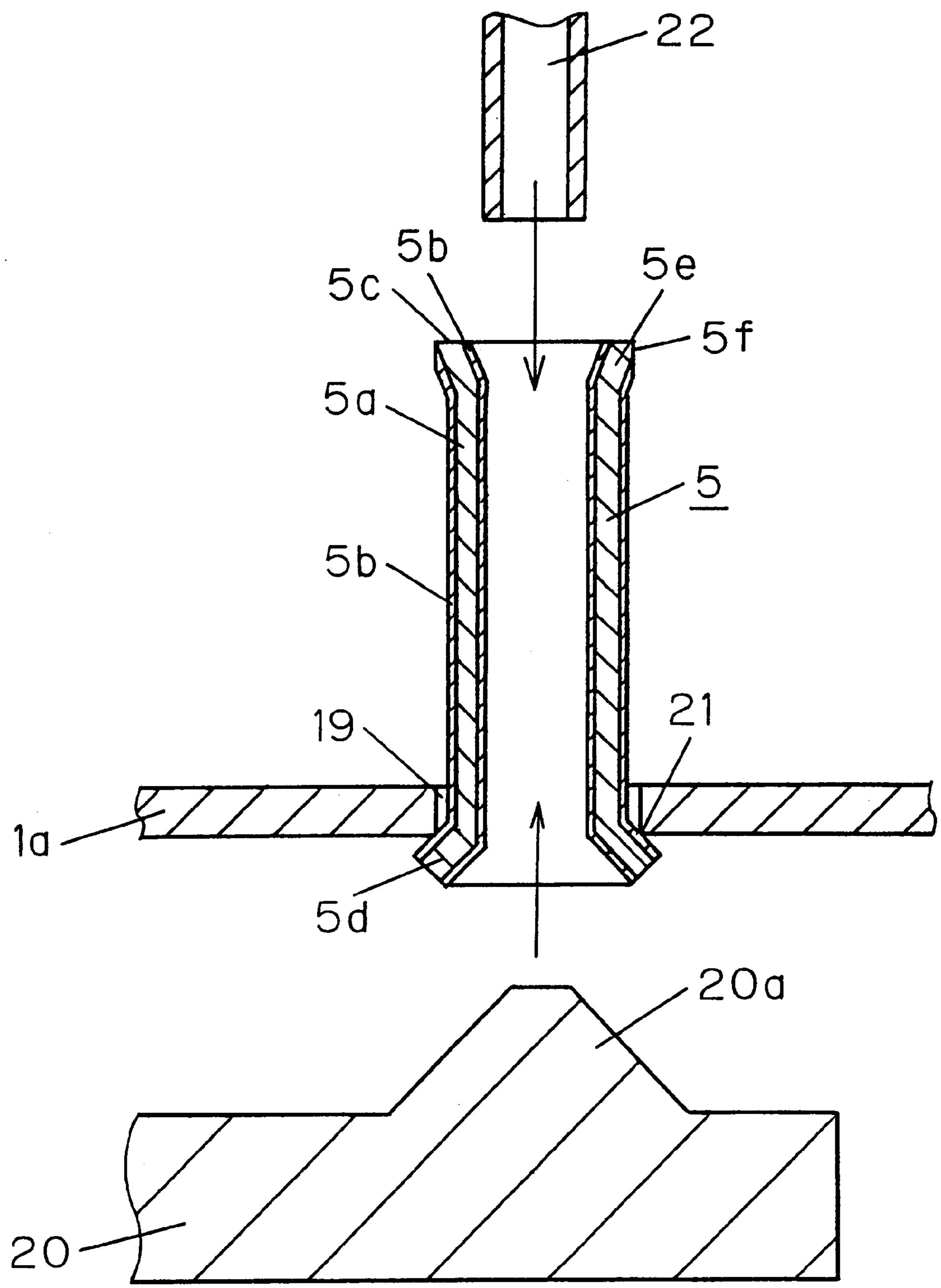
FIG. 5 is a vertical sectional view of a discharge pipe connector secured to the sealed compressor of FIG. 2.

FIG. 5 depicts the manner in which the discharge pipe connector 5 is made.

The discharge pipe connector 5 is made of a copper-plated steel pipe 5*a* having copper deposits 5*b* formed on opposite surfaces thereof. In making the discharge pipe connector 5, copper-plating is carried out after the steel pipe has been molded. To reduce the manufacturing cost of the discharge pipe connector 5, a copper-plated steel pipe may be molded into the shape of the discharge pipe connector 5. Alternatively, a copper-plated steel plate may be formed into a generally cylindrical shape by pressing, as discussed above. Attention must be paid to the fact that no copper-plated portion is present on a cut surface 5*c* in the latter two cases.

The discharge pipe connector 5 has a tapered inner end 5*d* expanding outwardly towards the inside of the sealed casing 1 and a tapered outer end 5*e* expanding outwardly towards the outside. The tapered inner end 5*d* is secured to the upper cover 1*a* of the sealed casing 1, while a discharge pipe (not shown) is connected to the tapered outer end 5*e*. The external side of the tapered outer end 5*e* is cut as shown by 5*f* so that the external diameter of the outer end 5*e* may be smaller than the diameter of a hole 19 defined in the upper cover 1*a* of the sealed casing 1.

The discharge pipe connector 5 of the above-described structure is first inserted into the hole 19 of the upper cover 1*a* from inside until the tapered inner end 5*d* having an external diameter greater than the diameter of the hole 19 abuts against an edge 21 of the hole 19. Thereafter, a welding electrode 20 having a protruding portion 20*a* of substantially the same angle as the tapered inner end 5*d* is pressed against the tapered inner end 5*d*, thereby sandwiching and holding the tapered inner end 5*d* between the edge 21 of the hole 19 and the protruding portion 20*a* of the welding electrode 20. At this moment, it is important that the edge 21 of the hole 19 is sharp and not rounded. A relatively large electric current is then caused to flow through the welding electrode 20 and the upper cover 1*a* of the sealed casing 1. Because the tapered inner end 5*d* of the discharge pipe connector 5 is held in abutment with the sharp edge 21 of the hole 19 of the upper cover 1*a*, the electric current is concentrated on such a portion. As a result, the copper deposit 5*b* is removed from the external surface of the discharge pipe connector 5, and the base material of the discharge pipe connector 5, i.e., the steel pipe 5*a* is hermetically welded to the steel upper cover 1*a* of the sealed casing 1.

This kind of joining does not use flux and, hence, water washing for removal of the flux is not required. Furthermore, because the amount of dirt or dust produced during joining is relatively small, the sealed casing 1 can be washed easily. Accordingly, even in the case where an HFC refrigerant listed as a candidate for an alternative refrigerant that causes no destruction of the ozone layer is used with an ester-based lubricant compatible therewith, the reliability of the compressor can be ensured because chlorine contained in the flux or water which has been hitherto used for removal of the flux does not remain in the sealed casing 1.

The tapered outer end 5*e* of the discharge pipe connector 5 is copper-brazed to a discharge pipe 22 generally made of copper. When the discharge pipe 22 is inserted into the tapered outer end 5*e* of the discharge pipe connector 5, the former faces the inner deposit 5*b* of the latter, facilitating the copper-brazing.

Figure 6:
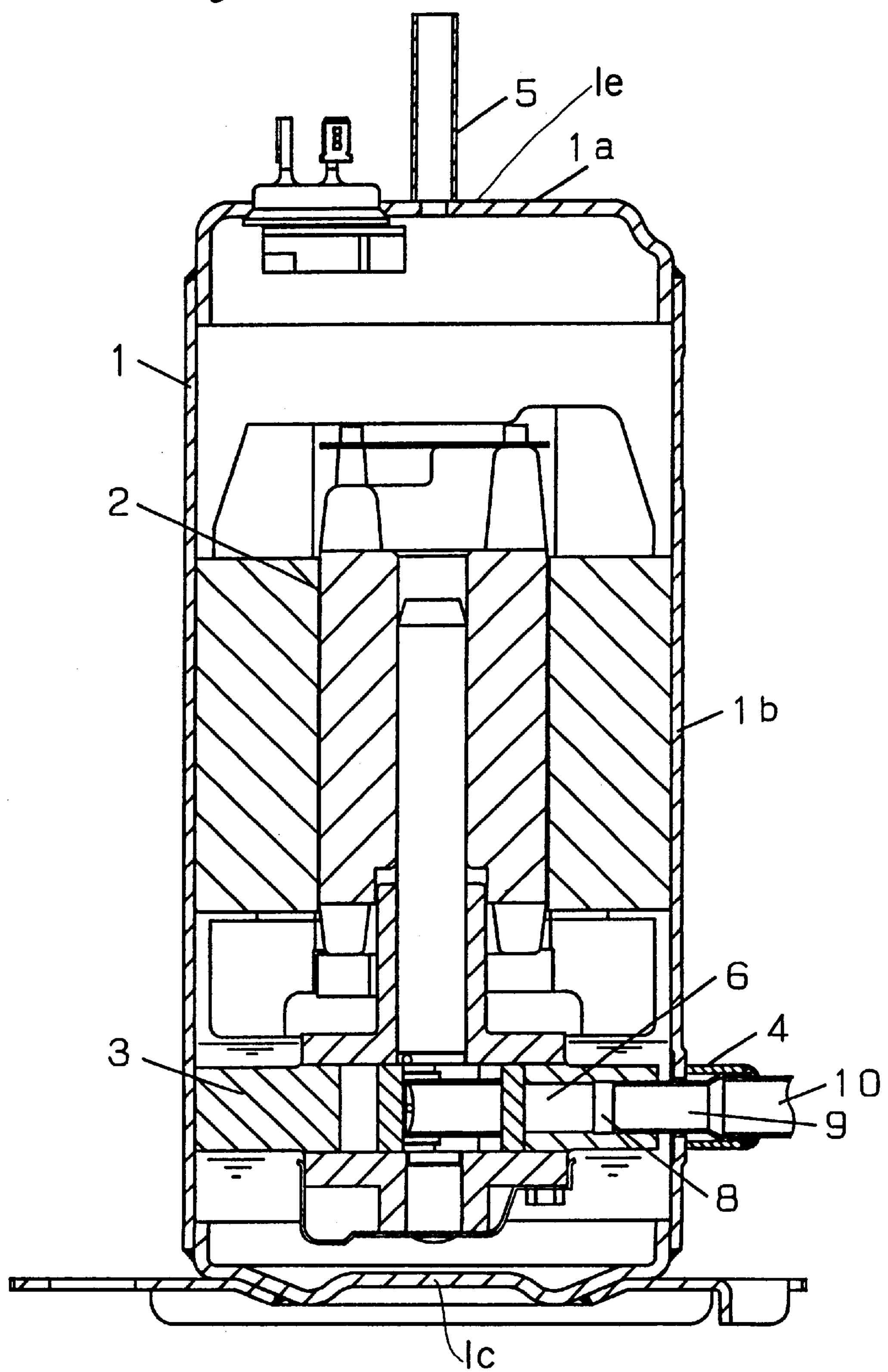
FIG. 6 is a view similar to FIG. 2, but according to a second embodiment of the present invention.

FIG. 6 depicts a sealed compressor according to a second embodiment of the present invention.

The sealed compressor includes a sealed casing 1 having a generally cylindrical body 1*b*, an upper cover 1*a* secured to an upper portion of the cylindrical body 1*b*, and a bottom cover 1*c* secured to a lower portion of the cylindrical body 1*b*. They are each formed from a steel plate and hermetically welded together to form the sealed casing 1. A motor section 2 and a compression section 3 are both accommodated in the sealed casing 1. The compression section 3 includes a rolling-piston type compression mechanism, and the sealed casing 1 is filled with a high-pressure refrigerant discharged therefrom when the compressor is in use. A suction pipe connector 4 through which a refrigerant is introduced into the sealed casing 1 is secured to the cylindrical body 1*b*, while a discharge pipe connector 5 through which the high-pressure refrigerant is discharged from the sealed casing 1 is secured to the upper cover 1*a*. The suction pipe connector 4 and the discharge pipe connector 5 lead to an evaporator (not shown) and a condenser (not shown), respectively, to form a refrigeration cycle.

Figure 7:
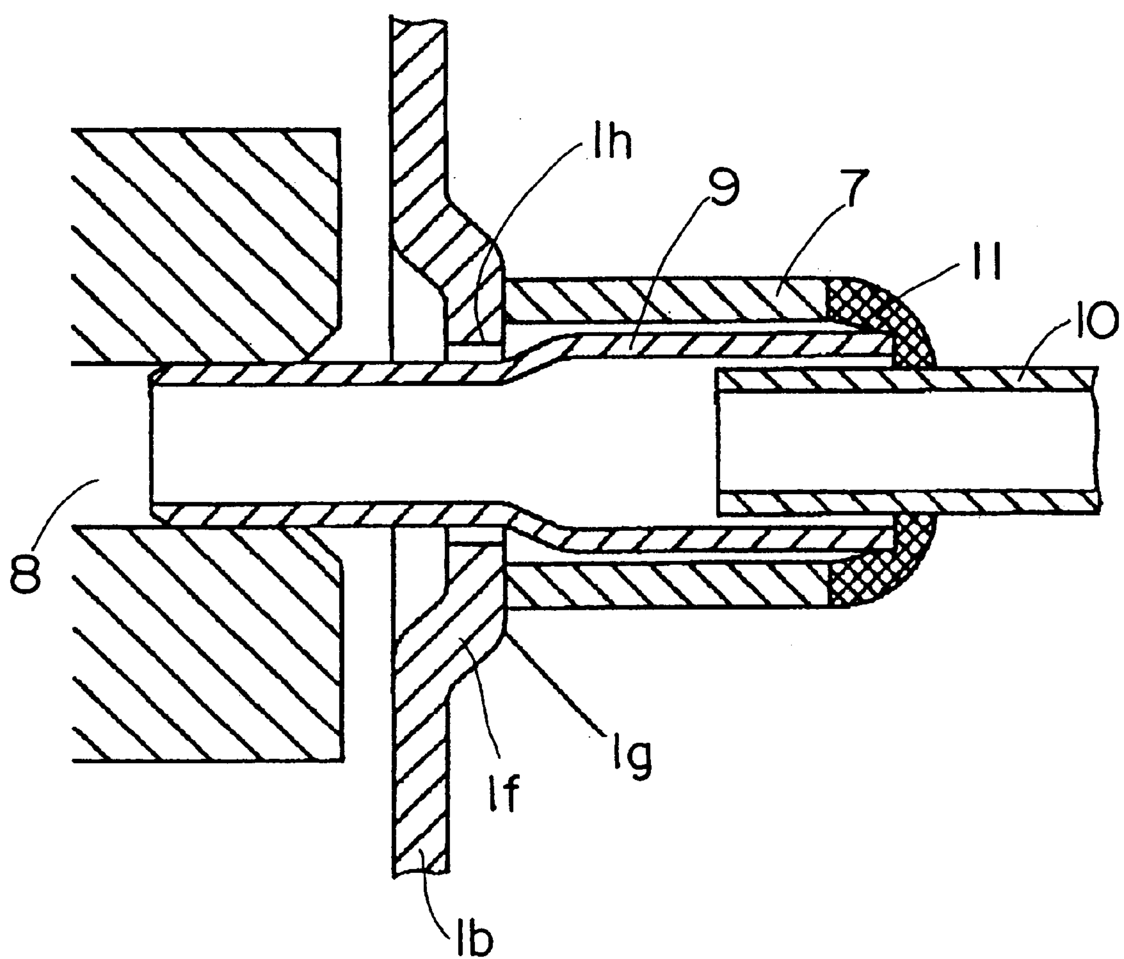
FIG. 7 is a vertical sectional view of a suction pipe connector secured to the sealed compressor of FIG. 6.

As shown in FIG. 7, the cylindrical body 1*b* of the sealed casing 1 has a radially outwardly protruding portion 1*f* formed therewith. The protruding portion 1*f* has a generally flat top 1*g* and a round hole 1*h* defined therein at the center thereof in alignment with a suction hole 6 and a suction sleeve insertion hole 8 both defined in the compression section 3. The suction sleeve insertion hole 8 is positioned radially outwardly of the suction hole 6 and has a diameter slightly larger than that of the suction hole 6. A copper external suction sleeve 7 is directly and hermetically welded to the generally flat top 1*g* of the protruding portion 1*f* so as to communicate with the hole 1*h*. An internal suction sleeve 9 is pressed into the suction sleeve insertion hole 8 from outside so that a low-pressure refrigerant to be introduced into the sealed casing 1 may be separated from a high-pressure refrigerant inside the sealed casing 1. The length of the internal suction sleeve 9 is determined so that an outer end thereof may be positioned radially outwardly of an outer end of the external suction sleeve 7. After a suction pipe 10 has been inserted into the internal suction sleeve 9 pressed into the suction sleeve insertion hole 8, the suction pipe 10, the internal suction sleeve 9 and the external suction sleeve 7 are simultaneously hermetically secured together by brazing 11, thereby separating the external atmosphere, the low-pressure refrigerant introduced into the sealed casing 1, and the high-pressure refrigerant inside the sealed casing 1 from one another.

The discharge pipe connector 5 is made of a copper pipe and is hermetically welded to a flat portion 1*e* of the upper cover 1*a* so as to communicate with a hole defined therein. The discharge pipe connector 5 is generally connected to a copper discharge pipe (not shown) by copper-brazing.

In the above-described construction, because the pipe connectors 4 and 5 to which the suction and discharge copper pipes are connected are directly welded to a steel plate, no brazing material or flux is required, thus simplifying the assembling processes of the compressor. Furthermore, because the copper pipes are not annealed by flames, they are not deteriorated in strength, realizing firm joining. Also, because the external suction sleeve 7 does not protrude inside the sealed casing 1, it does not hinder incorporation of the motor section 2 and the compression section 3 into the sealed casing 1.

Figure 8A:
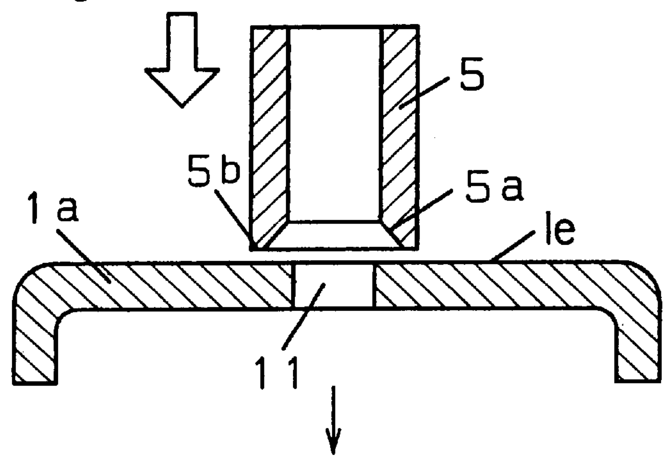
FIG. 8A is a vertical sectional view of a discharge pipe connector before it is secured to the sealed compressor of FIG. 6.
Figure 8B:
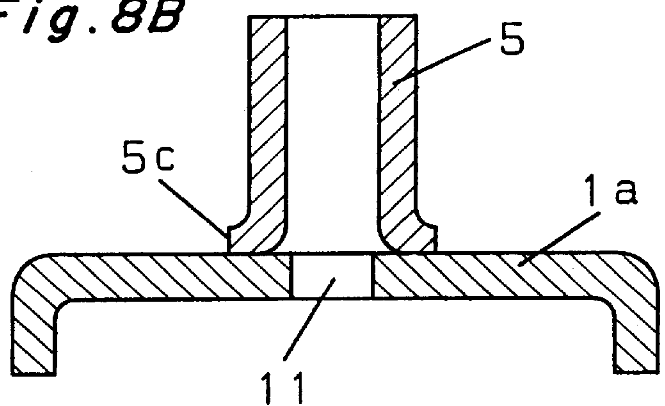
FIG. 8B is a view similar to FIG. 8A, illustrating the discharge pipe connector secured to the sealed compressor.

FIGS. 8A and 8B depict the manner in which the discharge pipe connector 5 is joined to the sealed casing 1.

Because the upper cover 1*a* constitutes an end plate of the sealed casing 1, the upper cover 1*a* generally has a flat portion 1*e*. Accordingly, a hole 11 that is to communicate with the discharge pipe connector 5 is formed in such a flat portion 1*e* of the upper cover 1*a*.

On the other hand, the discharge pipe connector 5 is a copper pipe having a lower end 5*b* of which the internal surface 5*a* is tapered. Accordingly, the lower end 5*b* of the discharge pipe connector 5 is relatively sharp. Prior to welding, the upper cover 1*a* and the copper pipe are washed for removal of oil and the like. Thereafter, the copper pipe is axially movably arranged above the upper cover 1*a*, which is held stationary and grounded. The copper pipe is then positioned on and pressed against the upper cover 1*a*, while a relatively large DC current is caused to flow therethrough. Because the lower end of the copper pipe is relatively sharp, a large amount of heat is generated at this portion by the DC current, resulting in an increase in temperature and softening of the copper pipe. At this moment, the pressure applied to the copper pipe from above extends the lower end 5*b* of the copper pipe radially outwardly while removing an oxide layer on the flat portion 1*e* of the upper cover 1*a*. A further flow of DC current increases the temperature of the lower end 5*b* of the copper pipe to fuse it. Because steel has a thermal conductivity smaller than that of copper, that portion of the steel plate which is held in contact with the copper pipe is increased in temperature, thus diffusing copper atoms into such a portion. Continued application of pressure completely hermetically welds the copper pipe to the upper cover 1*a*. The radially outward extension and the subsequent fusion of the lower end 5*b* of the copper pipe increases a contact area and reduces the current density, resulting in a reduction in the amount of heat generated in the contact portion between the copper pipe and the upper cover 1*a*. In order to complete proper welding, however, it is preferred that the DC current value be reduced at a final process. It is also preferred that the application of pressure be continued to promote diffusion with a somewhat smaller force even after the DC current has been cut off.

Figure 9A:
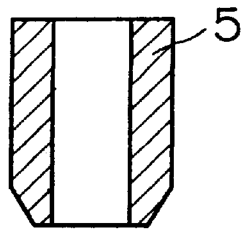
FIG. 9A is a vertical sectional view of a modification of the discharge pipe connector.

It is to be noted here that although the discharge pipe connector 5 is illustrated as having a tapered internal surface at the lower end thereof prior to welding, it may have a tapered external surface at the lower end thereof, as shown in FIG. 9A. In this case, however, attention must be paid to burrs that may protrude inwardly of the discharge pipe connector 5.

It is also to be noted that although the above embodiment has been discussed with respect to joining the discharge pipe connector 5 to the upper cover 1*a* of the sealed casing 1, the external suction sleeve 7 can be joined to the cylindrical body 1*b* of the sealed casing 1 in substantially the same manner.

Because the above-described joining method enables direct welding of copper pipes to a steel plate, no brazing material or flux is required. Accordingly, even in the case where an HFC refrigerant is used with an ester-based lubricant compatible therewith, the reliability of the compressor can be ensured because chlorine contained in flux or water which has been hitherto used for removal of the flux does not remain in the sealed casing 1. Furthermore, because water washing for removal of the flux is not required, the manufacturing cost of the compressor can be reduced. Also, because flames of a torch or the like are not used, the copper pipes are not annealed and, hence, not deteriorated in strength. In addition, fusion of copper and diffusion of copper atoms into a steel member realize firm joining.

Figure 9B:
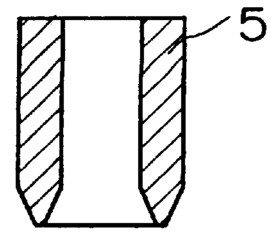
FIG. 9B is a view similar to FIG. 9A, illustrating another modification of the discharge pipe connector.

It is to be noted that although in the above-described embodiment the copper pipe constituting the discharge pipe connector 5 has been described as being axially pressed against the sealed casing 1, the copper pipe may be rotated during axial pressing, thereby removing an oxide layer for subsequent diffusion-joining. In this case, although the lower end of the copper pipe need not be tapered, outward tapering as shown in FIG. 8A or tapering on respective sides of the copper pipe as shown in FIG. 9B concentrates electric current on the lower end of the copper pipe, making it easy to select the welding conditions.

It is also to be noted that although a rolling-piston type sealed compressor is employed in the above-described embodiments, the present invention is also applicable to other compressors including low-pressure type reciprocating compressors, scroll compressors and the like.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. In a sealed compressor having a sealed casing in which a motor section and a compression section are both accommodated, the improvement comprising:

a first sleeve having a first end and a second end opposite to each other, said first end being inserted into a sleeve insertion hole defined in the compression section to allow a refrigerant to flow therethrough, said second end adapted to be hermitically brazed to a copper pipe disposed outside the sealed casing, said first sleeve having a generally cylindrical shape and being formed such that said first end has an axially-rounded external surface, while said second end has an axially-rounded internal surface.

2. The sealed compressor according to claim 1, further comprising a second sleeve in which said first sleeve is inserted, wherein said second end is flared and wherein said second sleeve is hermetically brazed to an external surface of said first sleeve, while the copper pipe is hermetically brazed to an internal surface of said first sleeve.

3. The sealed compressor according to claim 1, wherein said first sleeve is formed of a deep-drawn copper-plated steel plate.

* * * * *